J. P. M. M. CHRISTENSEN.
BRIDGE OR FERRY.
APPLICATION FILED MAY 10, 1907.

1,073,794.

Patented Sept. 23, 1913.
5 SHEETS—SHEET 1.

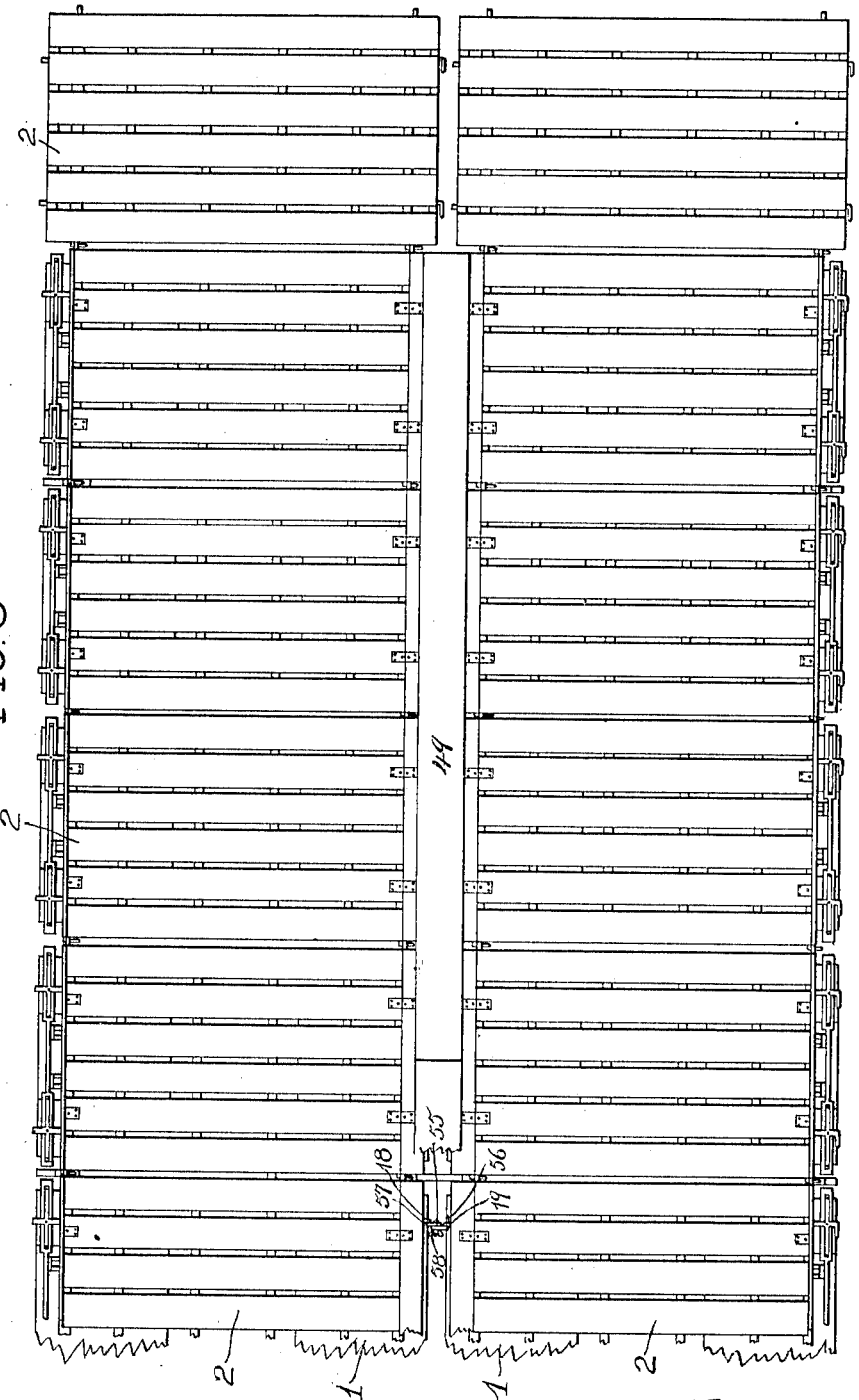

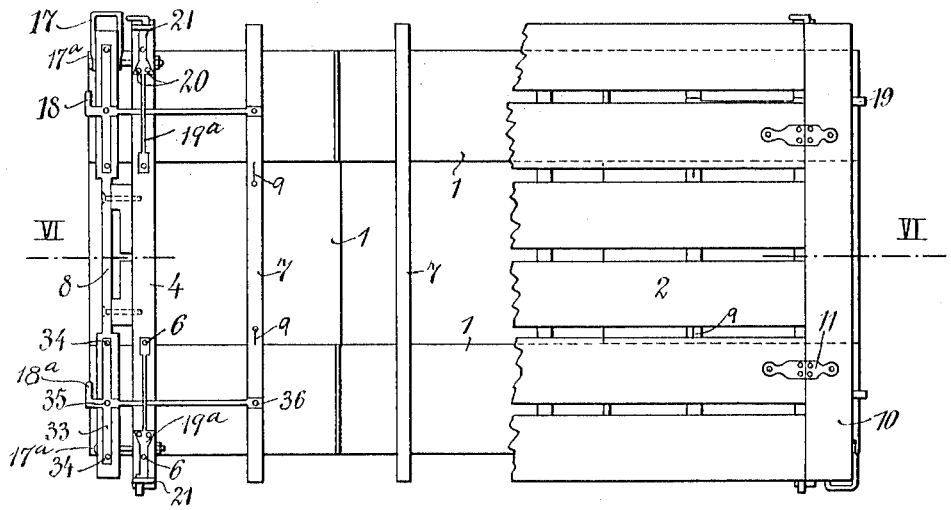
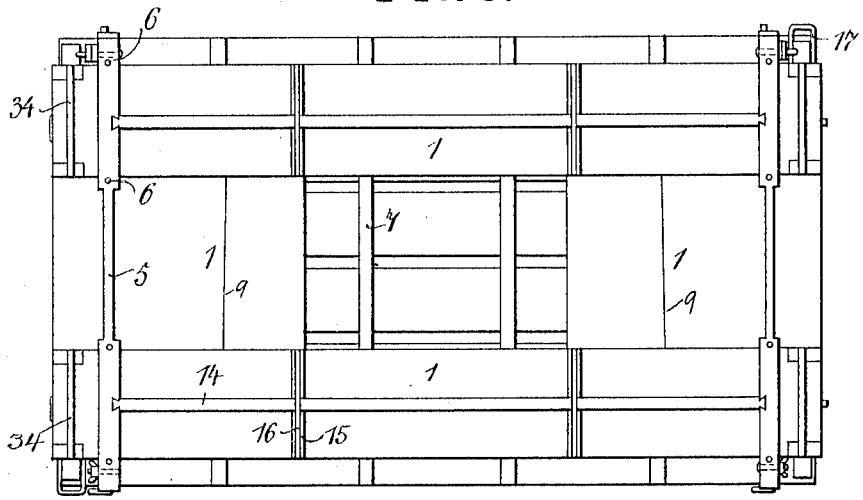
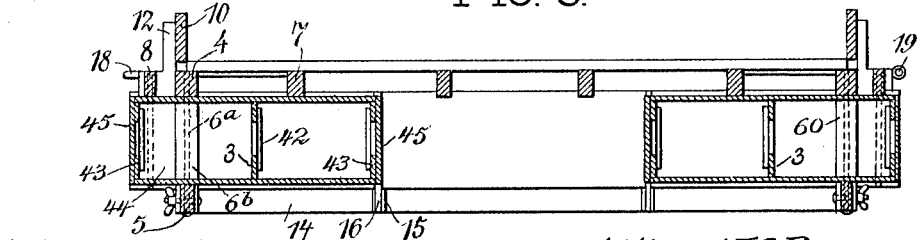

J. P. M. M. CHRISTENSEN.
BRIDGE OR FERRY.
APPLICATION FILED MAY 10, 1907.
1,073,794. Patented Sept. 23, 1913.
5 SHEETS—SHEET 4.
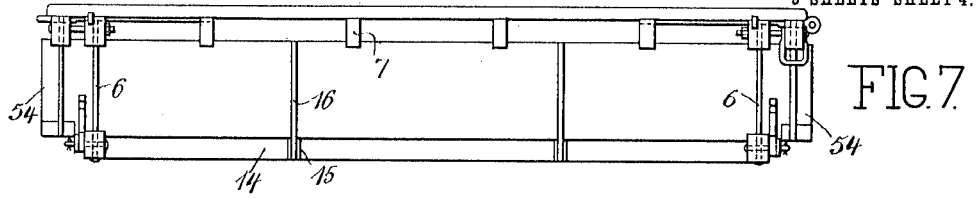
FIG. 7.
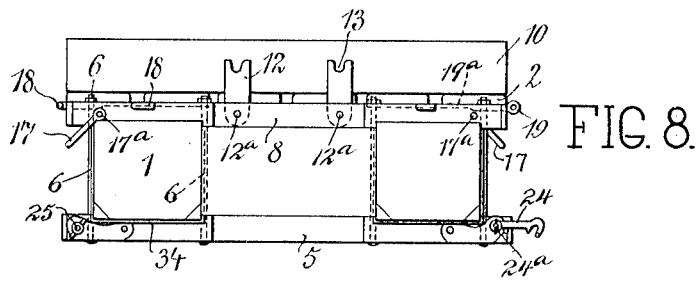
FIG. 8.
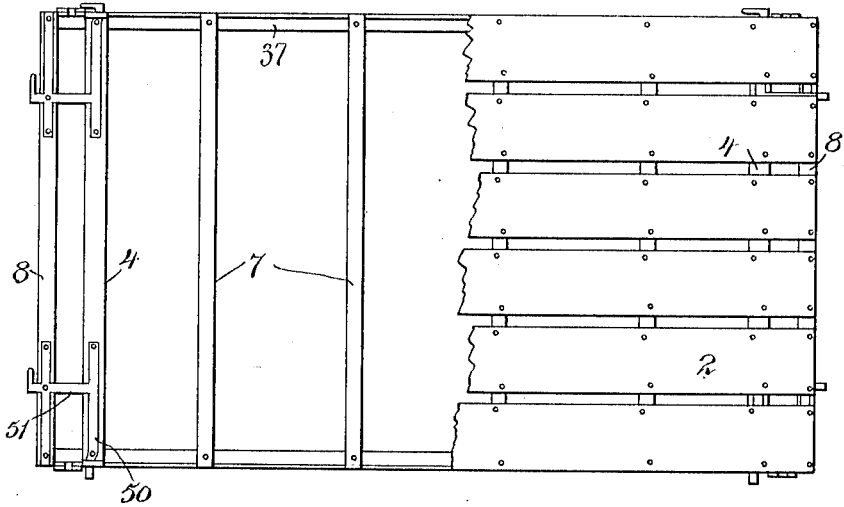
FIG. 9.
FIG. 10.
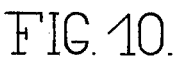
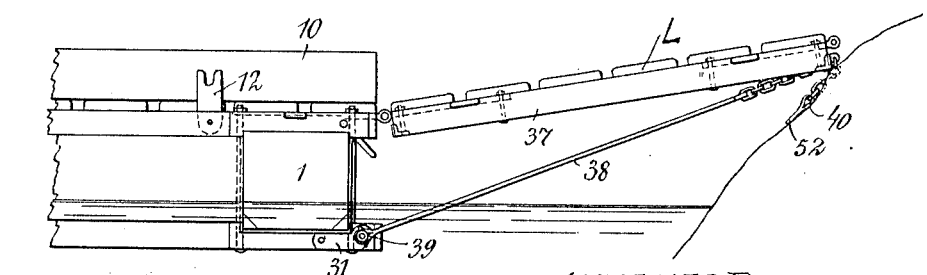

J. P. M. M. CHRISTENSEN.
BRIDGE OR FERRY.
APPLICATION FILED MAY 10, 1907.

1,073,794.

Patented Sept. 23, 1913.
5 SHEETS—SHEET 5.

WITNESSES:
John C. Sanders
Albert F. Heuman

INVENTOR:
Jens Peter Marius Mathias Christensen
BY M. Wallace White
ATT'Y

COLUMBIA PLANOGRAPH CO., WASHINGTON, D. C.

UNITED STATES PATENT OFFICE.

JENS PETER MARIUS MATHIAS CHRISTENSEN, OF COPENHAGEN, DENMARK.

BRIDGE OR FERRY.

1,073,794.

Specification of Letters Patent. Patented Sept. 23, 1913.

Application filed May 10, 1907. Serial No. 372,984.

*To all whom it may concern:*

Be it known that I, JENS PETER MARIUS MATHIAS CHRISTENSEN, captain of the Royal Danish Engineers, subject of Denmark, residing at 77 Kongensgade street, Copenhagen, in the Kingdom of Denmark, have invented new and useful Improvements in Bridges or Ferries, of which the following is a specification.

This invention relates to portable or pontoon bridges, such as are used by armies and the like.

One of the features of the invention is to provide a plurality of similar elements which may be readily joined to one another to form a bridge, each element comprising buoyant means to which flooring is secured.

Other objects will be in part obvious and in part pointed out hereinafter.

The elements are provided at the top edge with suitable fittings in the form of horizontal hinges, so that the bridge—so long as it is connected only by these joints—is flexible, bending on horizontal lines running transversely to the direction of length; it can consequently be pushed down a bank in inclined position righting itself gradually into a horizontal position on entering the water. In order to render the bridge rigid, when pushed into the water, suitable fittings are provided at the lower edges of the elements.

Figure 1:
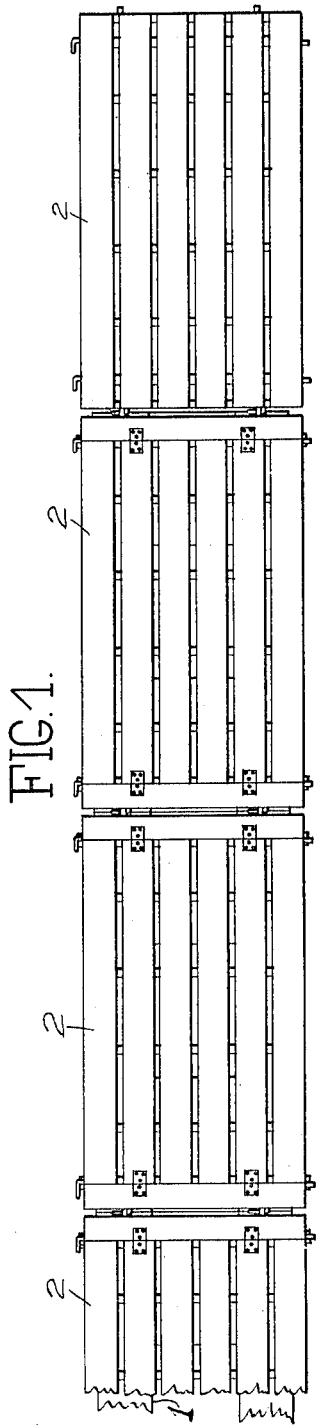
Figure 2:
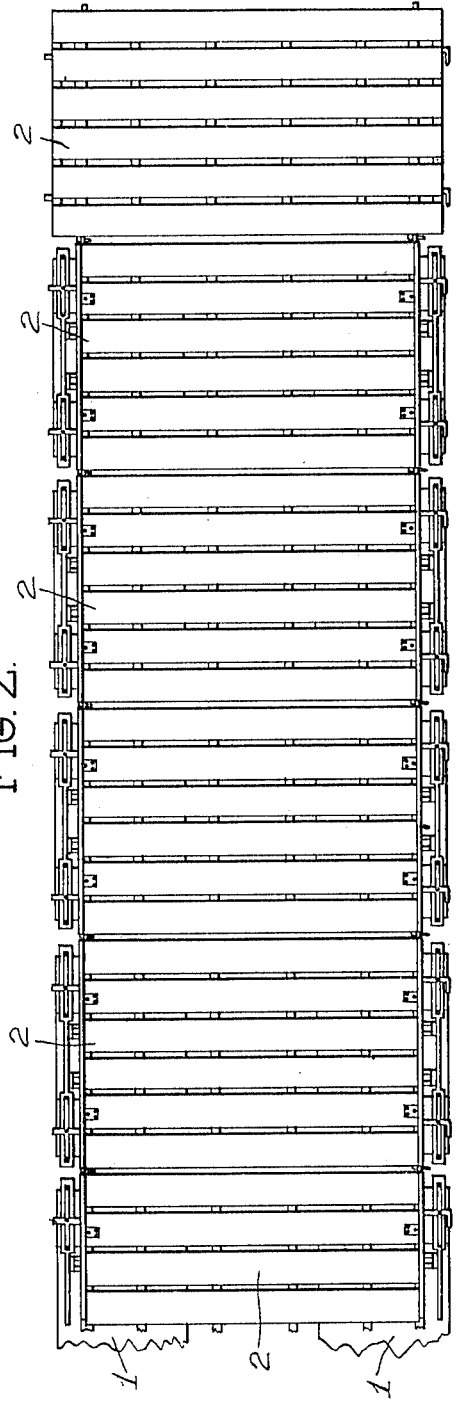
Figure 11:
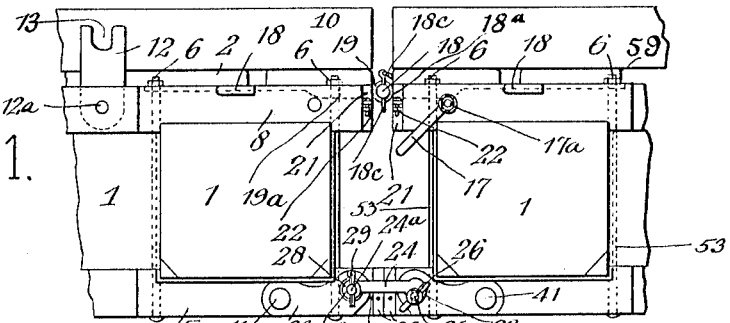
Figures 12, 13:
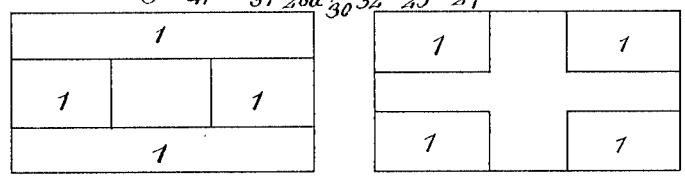
Figure 14:
Figure 15:
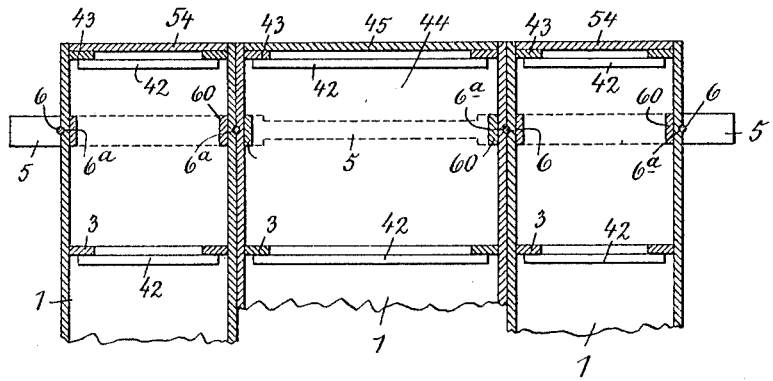

Figure 1 is a plan of a light bridge (foot-bridge) constructed on my system. Fig. 2 is a like view of a stronger such bridge (regular bridge). Fig. 3 is a like view of a double bridge. Fig. 4 is a plan of one of the elements of the bridge or ferry. Fig. 5 is an underside view of Fig. 4. Fig. 6 is a section on the line VI—VI of Fig. 4. Fig. 7 is a side elevation of Fig. 4. Fig. 8 is an end elevation thereof. Fig. 9 is a plan of a landing-platform. Fig. 10 shows the same in side elevation. Fig. 11 is a side elevation showing the assembling- or coupling-parts. Figs. 12 and 13 illustrate diagrammatically two forms in which the elements may be constructed. Fig. 14 illustrates diagrammatically one form of construction of the raft-boxes of the elements. Fig. 15 is a horizontal section of the raft-boxes.

The new bridge or ferry is constructed of a number of like elements, which are connected together by means of suitable fittings. Special landing-platforms may be employed to connect the bridge or ferry with the bank.

Each element consists of a flooring of boards 2 secured to one or more raft-boxes 1. The latter may be made of any suitable water tight light material. The raft-boxes 1 must be so secured—for instance below the corners of the said flooring 2—that each element is stable and capable of floating. Figs. 12 and 13 show examples of the method of locating the said boxes. With the construction illustrated in Fig. 13 there is less resistance offered to the current. For the latter reason, also, the sides of the boxes may be given another form, (for example that shown in Fig. 14) than the rectangular one shown in the drawings in general.

The fittings which serve to connect the elements may preferably be employed on all four sides of the element in order, that the latter may be connected in both directions in the bridge (see Figs. 1–3). In the event of the elements being coupled both in transverse and longitudinal direction, as shown in Fig. 3, the transverse stiffening may be done by means of wedged or lashed planking 49.

Figs. 4–8 show a form of construction for bridge or ferry elements, which in proportion to the weight possess a great carrying-power and are capable of being used for manifold purposes. The element consists of four raft-boxes 1, located between cross-ties 4, 5, 7, 8, the upper ties 4, 7, 8 support the flooring-boards 2. The boxes 1 are of wood of low specific gravity and not liable to split or crack, nor warp unduly. Two long and two short boxes 1 are employed, the former being about 2 meters in length.

The boxes 1 are rendered water tight in a particular manner, which, however, forms no part of the present invention. They are stiffened by cross-stays 3, which in view of the weight are constructed as frames, which can be strengthened at both sides by means of thin fillets 42; they may, however, be constructed as watertight bulkheads. The ends are double, the inner end piece 43 lying in the chamber 44 formed by the walls, while the edges of the outer one 45 are flush with the outside surfaces of the walls.

The walls of the boxes being, as already remarked, very thin, fastening-devices can not be secured to them. The two long boxes 1, which lie parallel, at a certain distance apart, are held together by two sets of ties 4 and 5 lying transversely above and below them, at a few centimeters from the ends 54, at the parts, where a couple of stays 60 are located in the boxes 1. Both the upper ties 4 and the lower ones 5 are clamped over the boxes 1. The main ties 4 and lower ones 5 project somewhat beyond the boxes 1. Each set of main and lower ties 4 and 5 is connected by means of four long upright bolts 6 located in pairs along the sides of the long boxes, into which they are let to a certain extent, so that the boxes by means of these bolts are kept tight between the ties. Above the boxes 1 there lie in addition to the main ties 4 also some intermediate ties 7, and beyond the main ties are the outside ties 8, all at the same level with the main ties 4 and clamped over the boxes 1.

At each end of the long boxes 1 there is inserted between the upper and lower ties 4 and 5 one of the short boxes 1 with its end lying flush with those of the long boxes. The short box 1 fits exactly into the space between the top and bottom ties 4, 5 and is held in position by means of long upright bolts 6, such as already referred to, fitting into its side walls 53, which have semicircular grooves 6ª to receive them. Whereas all the other walls of the boxes 1, are only about 1 centimeter thick, these side walls 53 are somewhat thicker, and at the parts where the said grooves 6ª lie they are strengthened by fillets 6ᵇ screwed to them. The short boxes are also held in place by means of the intermediate ties 7 lying nearest the main ties 4; they bear against these ties 7, while thin steel wire bands 9, secured to the latter are passed around the boxes 1 to afford support below.

The flooring-boards 2 are carried by the ties 4, 7, 8. The flooring consists of six boards 2 lying across the ties and screwed to them. A small space is left between the boards, and their upper edges 59, see Fig. 11 are rounded off. The boards 2 extend only from center to center of the main ties 4. The remaining portion at the end of each element, is covered by a board 10, which lies transversely to the others and may serve as railing or fence. It is secured to the other boards 2 by means of hinges 11, in such manner that it can be set on edge or laid flat. The hinges 11, do not close beyond a right angle, so that the board 10 can not flap over inwardly beyond the vertical position. In this position it is locked against outward motion by two supports 12 turning on a horizontal bolt 12ª located in the outer and main ties 8 and 4. When the board 10 is flapped down, the supports 12 lie in the space between said ties. The supports 12 are recessed at 13, so that they can be readily seized with the hand, when they are to be turned.

The long boxes 1 are protected at the bottom by keels 14. The latter are dovetailed into the bottom ties 5, with which they lie flush. They are supported by triangular timbers 15, which lie against the bottom of the boxes 1 and are secured thereto by means of two iron straps 16, which are passed around the boxes 1 at the places where the two central stiffening frames 3 are located. For attaching backstays, anchor-cables, or the like, two loops 17 are provided on each element, at opposite corners. The loop 17 turns on a horizontal bolt 17ª in the end of the outer tie 8. This bolt connects the outside tie with the adjacent main tie 4, so that the pull on the loop 17 is transmitted to the latter and thus to the whole bridge element. At the two corners of the element where there are no loops 17, the outside and main ties 8 and 4 are also connected by a bolt 17ª as just described.

For coupling the elements in the transverse direction, devices are provided both above and below, as shown in Fig. 11. The upper devices are a species of horizontal hinges. At the one side, the fittings 19ª are provided at the extreme end with horizontal pintles or hooks 18, while the corresponding fittings on the other side of the element terminate in knuckle-pieces or eyes 19 to receive such members. These fittings are secured to the main ties 4, being let into the top thereof. They are held partly by the long bolts 6 already mentioned, partly by two smaller bolts 20, which pass through the main tie 4; and finally by clamps 21 passed tightly around the ends of the main ties 4 and the outer end of the fittings 19ª. The clamps 21 comprise two halves held together by screws 22.

The eyes 19 of the fittings 19ª are but slightly larger than the diameter of the pins 18 and are rounded at the edges so as to allow the latter to slip in readily. The two pins 18 on the same side are of unequal length, so as to facilitate their insertion into the eyes 19. The axes of both pins 18 and eyes 19 lie so far beyond the ends of the main ties 4 that the bottom ties 5 butt together when the parts have been coupled. At the ends of the pins 18 are small holes 18ª to receive cotters 18ᵇ or the like after coupling, so as to prevent the parts becoming disconnected. The cotters 18ᵇ are secured to the bridge-elements by small thin straps 18ᶜ. As long as the elements are only connected by the fittings here described, the bridge so formed will bend on lines, which lie transversely of the same at the top edge. The bridge can thus be pushed down a bank in inclined position, righting itself gradually on entering the water.

In order to render the bridge rigid, like a continuous raft, lower fittings secured to the bottom ties 5 are provided, as shown in Fig. 11; they consist of two hooks 24, turning on horizontal bolts 24ᵃ lying in the bottom ties 5, and gripping suitable bolts 25 in the bottom ties 5 of the adjacent bridge-element. The bolts 25 thus seized by the hooks 24 are threaded at the end and furnished with wing-nuts 26, which can be screwed up tight against the hook 24 after the latter has seized the bolt 25. Should the nut 26 loosen through shocks, the hook 24 is still prevented from releasing the bolts 25 by means of a small projection 27 at the end, engaging with the edge of the nut 26. In order to prevent the hooks 24 dropping down when not desired, the collar 28, which in conjunction with a split pin 29 retains them in place, is provided inside with a spiral spring 28ᵃ coiled on the bolt 24ᵃ on which the hook 24 turns. This spring 28ᵃ presses the hook 24 against the bottom tie 5, so that the hook 24 is held in every position in which it may be set. In order that the hook 24 may not drop below the horizontal position, a small stop-pin 30 is screwed into the bottom tie 5.

The hooks 24 are located at the outside of the bottom ties 5, so as to be easy of access. On the bolts 24ᵃ on which they turn, and on the bolts 25 which they grip there is a strong pull exercised, especially when the chains 38 of the landing-platform (to be hereinafter referred to) are secured to them. To prevent the bolts 24ᵃ and 25 being thus torn from the bottom ties 5, the latter are strengthened by fittings 31, whereby the pull is partly transmitted to a horizontal bolt 41 located farther back. The fittings 31 also embrace the bottom of the tie 5, so that the latter also is strengthened against the pull exercised by the chains 38 in upward direction. The bottom ties 5 are further strengthened by rings 32 pushed over their ends in the hot state.

For the purpose of coupling the elements together in the longitudinal direction there are only upper fittings provided, which are of the same kind, as those above described with the horizontal pins 18 and eyes 19, but the method of fastening being different. Close within the pins 18 or eyes 19 the fittings are provided with wings or arms 33, located transversely to the direction of length, so that the fitting has the form of a cross. The arms 33 lie in the direction of the outside ties 8 and are let into the top of the latter. The fittings are held partly by screw bands 34, which pass through the arms 33 and ties 8 and around the end of the long box 1; partly by a small bolt 35, which passes through the tie 8; and partly by a wood screw 36, by means of which the inner end of the fitting 33 is secured to the intermediate tie 7 located next to the main tie 4.

Crossing from bank to bridge is enabled by means of a special landing-platform, as shown in Figs. 9 and 10. The platform corresponds in size with that of the just described bridge-element. It consists as shown in Fig. 9 of two main ties 4, two outer ties 8 and intermediate ties 7, of substantially the same dimensions as the ties of the element. The ties 4, 7, 8, rest on two girders 37 of figured-iron, some 2 meters in length, to which they are secured. The ties 4, 7, 8, support the flooring 2, which is without any railing. The landing-platform is provided both at the sides and ends with fittings similar to the upper coupling devices already described, but each side fitting 50 is forged in one piece with the end fitting 51 at the same corner, so that there are in all four double-fittings, one at each corner of the platform. Thus in addition to fulfilling their main office, the fittings 50, 51 also serve to strengthen the platform in transverse direction. The landing-platform is hooked at one end to the bridge-element, which lies nearest the bank, while the other end rests on the latter.

In the regular bridge shown in Fig. 2, it is important to insure undisturbed passage, that the end of the bridge does not tip, when a weight comes suddenly upon it (for instance, when a horse steps onto the bridge). Such tipping would occur, were the landing-platform only connected with the element nearest the shore by the hinge-couplings. It is prevented by means of two ropes or chains 38. These latter may consist of a flexible steel hawser, with strap 39 spliced on to the end, while there may be a short chain 40, with a terminal pin 52, at the other end. The chains 38 are so located, that their straps 39 take over the wing-nuts 26 on the bolts 25 in the bottom ties of the last element, in such manner that the straps 39 embrace these bolts 25 at the same place, where otherwise the hooks 24 would engage on coupling up two elements. When the landing-platform has been so coupled with the element, a suitable link of the chain 40 is hooked onto the girder 37 of the platform, depending upon the length required.

(*a.*) *A light foot-bridge of say 16 to 30 meters in length.* (See Fig. 1.)—This bridge is constructed by the elements being coupled together in the longitudinal direction, that is to say they lie lengthwise in the direction of length of the bridge. The work of laying such a bridge is extremely simple, since it consists merely in coupling the elements together on the shore, as a rule singly, and then pushing them down the bank gradually into the water. The landing-platforms, if material has to be economized, may be built into the bridge itself, in such manner that 3 to 4 elements come between each two landing-platforms. The crossing to the shore can then be effected by means of the extra planks carried in the wagon. The stability and carrying-power of the bridge will naturally be lessened in this manner, but is still sufficient for a foot bridge. This bridge can be laid in from 2 to 3 minutes, including the time consumed in unloading the wagons.

(b.) *A stronger bridge, regular bridge, of say 10 meters in length.* (See Fig. 2.)— This bridge is built by the elements being coupled together transversely, that is, they lie crosswise in the bridge. The bridge is laid by the elements being coupled together as the above, three elements being as a rule coupled in at once; this can be readily done, since the elements lie coupled in threes in the wagon. To facilitate the work of laying, a stage should first be erected consisting of two planks running from the bank down into the water. When the coupling is finished, the bridge is gradually slid down the stage, and when coming into the water the rigid coupling can be done gradually by the hooks 24 on the lower ties 5 being thrown over the bolts 25 of the lower ties of the adjacent element, whereupon the wing-nuts 26 can be screwed up with the hand. The rail boards 10 are now set up and secured by the supports 12 behind being turned up. When an adequate number of elements has been pushed into the water, the landing-platforms are erected. This bridge also can be laid very rapidly, about 5 minutes sufficing. It is strong enough to carry troops and unlimbered guncarriages, which latter, however, would have to be pulled over the bridge by the troops.

(c.) *A still heavier, double-bridge.* (See Fig. 3.)—This bridge is built by two parallel regular bridges being united to form a single bridge. This is done by a small coupling-fitting 55 being first provided at a few places, the fitting having a pin 56 at one end and an eye 57 at the other, so that it can be pushed into one of the eyes 19 and over one of the pins 18 at the oppositely located sides of the two bridges. As it is difficult to maintain the same distance apart of the bridges everywhere, the length of the coupling-fitting may be rendered variable by means of a joint in the middle, which, when the fitting has been set in place, can be rendered rigid by means of a wing-nut 58 screwed up with the fingers.

For laying anchors or for carrying over hawsers, a vessel is constructed, consisting of one or two elements, depending upon the strength of the current and of the wind or the extent of the water, and it can be rowed by one or two men.

For swamp-bridges, that is, bridges over swampy or marshy places, soft banks, or the like, the material described can be used with much advantage. The landing-platforms at disposal can be inserted between the elements without the stability being effected in this case.

As already remarked, the material here described in detail is only one form of construction of the means employed in the construction of bridges or ferries according to the new principle underlying my invention, many other forms of construction being possible.

Having now described my invention, what I claim as new and desire to secure by Letters Patent is:—

1. A bridge or ferry, comprising a plurality of elements, each element comprising watertight raft boxes, top cross ties to which the boxes are strapped, bottom cross ties bolted to the top ones, and a flooring secured to and carried by the tied boxes, substantially as described.

2. A bridge or ferry comprising a plurality of elements, each element comprising water-tight buoyant boxes, and a flooring secured to and carried by said boxes, upper assembling devices for coupling each element with a like element, said devices consisting of two horizontal pins located at two sides of the element and two eyes located at the opposite sides, and lower assembling devices for coupling each element with a like element, each of said devices consisting of two pivotal hooks on one side of the element, and two corresponding pins having wing nuts screwed on their ends positioned on the opposite side, said upper and lower assembling devices being adapted to attachably couple an element with a like element and prevent transverse tipping of any element with respect to the element adjacent thereto.

3. A bridge or ferry, comprising a plurality of elements each comprising water-tight raft boxes, a flooring secured to and carried thereby and devices for coupling the element with a like element, a landing platform, comprising a floor, ties carrying the same, two figured iron girders supporting the ties, devices located at the sides for joining the platform to the top of a bridge element, and flexible means having an eye at the end for securing the shore-end of the platform to the bottom of such element, substantially as described.

In testimony whereof I have signed my name to this specification in the presence of two subscribing witnesses.

JENS PETER MARIUS MATHIAS CHRISTENSEN.

Witnesses:
B. POULSEN,
A. POULSEN.